United States Patent
Lu et al.

(10) Patent No.: US 12,378,940 B2
(45) Date of Patent: Aug. 5, 2025

(54) UNDERWATER DUCTED HYDROELECTRIC POWER GENERATION SYSTEM

(71) Applicant: Yao Lu, Beijing (CN)

(72) Inventors: Jirong Lu, Beijing (CN); Yao Lu, Beijing (CN)

(73) Assignee: Yo Lu, Beijing (CN)

( * ) Notice: Subject to any disclaimer, the term of this patent is extended or adjusted under 35 U.S.C. 154(b) by 0 days.

(21) Appl. No.: 18/591,072

(22) Filed: Feb. 29, 2024

(65) Prior Publication Data

US 2024/0200527 A1   Jun. 20, 2024

Related U.S. Application Data

(63) Continuation of application No. PCT/CN2021/000199, filed on Sep. 27, 2021.

(30) Foreign Application Priority Data

Sep. 23, 2021 (CN) .......................... 202111110394.2
Sep. 23, 2021 (CN) .......................... 202122295353.7

(51) Int. Cl.
*F03B 13/10* (2006.01)
*F03B 17/06* (2006.01)
(Continued)

(52) U.S. Cl.
CPC ............ *F03B 13/10* (2013.01); *F03B 17/061* (2013.01); *H02K 5/1737* (2013.01); *H02K 7/088* (2013.01);
(Continued)

(58) Field of Classification Search
CPC ........ F03B 13/10; F03B 17/061; F03B 13/06; H02K 5/1737; H02K 7/088; H02K 7/1823;
(Continued)

(56) References Cited

U.S. PATENT DOCUMENTS 3,783,302 A * 1/1974 Woodbridge ....... F03B 13/1855
310/15
6,731,018 B1 * 5/2004 Grinsted ................. F03B 17/06
290/43
(Continued)

FOREIGN PATENT DOCUMENTS

CN 101603496 A 12/2009
CN 102748196 A 10/2012
(Continued)

*Primary Examiner* — Charles Reid, Jr.

(57) ABSTRACT

An underwater ducted hydroelectric power generation system is provided, including a ducted U-shaped pipe, a floating installation platform, a lifting pipe, a ducted coreless hydroelectric generator and a ducted coreless water transfer pump. The ducted U-shaped pipe is arranged underwater. The floating installation platform is configured to fix the ducted U-shaped pipe. A lower end of the lifting pipe is fixed on an underwater ground, and an upper end of the lifting pipe is slidably connected to the floating installation platform. The ducted coreless hydroelectric generator is fixedly provided in a water inlet pipe of the ducted U-shaped pipe. The ducted coreless water transfer pump is fixedly provided in the ducted U-shaped pipe.

10 Claims, 11 Drawing Sheets

(51) Int. Cl.
     *H02K 5/173*    (2006.01)
     *H02K 7/08*     (2006.01)
     *H02K 7/18*     (2006.01)
     *H02K 21/14*    (2006.01)

(52) U.S. Cl.
     CPC ........... *H02K 7/1823* (2013.01); *H02K 21/14* (2013.01); *F05B 2220/32* (2013.01); *F05B 2220/7068* (2013.01)

(58) Field of Classification Search
     CPC ................. H02K 21/14; F05B 2220/32; F05B 2220/7068; E02B 9/00; Y02E 10/20; Y02E 60/16
     USPC ..................................................... 290/43, 54
     See application file for complete search history.

(56) References Cited

U.S. PATENT DOCUMENTS

| | | | |
|---|---|---|---|
| 8,866,320 B2 * | 10/2014 | Perregrini | F03D 9/25 |
| | | | 290/44 |
| 9,777,699 B1 | 10/2017 | Decady | |

FOREIGN PATENT DOCUMENTS

| | | |
|---|---|---|
| CN | 108005852 A | 5/2018 |
| CN | 212958930 U | 4/2021 |
| CN | 213450660 U | 6/2021 |

* cited by examiner

UNDERWATER DUCTED HYDROELECTRIC POWER GENERATION SYSTEM

CROSS-REFERENCE TO RELATED APPLICATIONS

This application is a continuation of International Patent Application No. PCT/CN2021/000199, filed on Sep. 27, 2021, which claims the benefit of priority from Chinese Patent Applications No. 202111110394.2 and No. 202122295353.7, both filed on Sep. 23, 2021. The content of the aforementioned application, including any intervening amendments made thereto, is incorporated herein by reference in its entirety.

TECHNICAL FIELD

This application relates to hydroelectric power generation, and more particularly to an underwater ducted hydroelectric power generation system integrating a ducted coreless hydroelectric generator and a ducted coreless water transfer pump.

BACKGROUND

Conventional hydroelectric power plants are mainly composed of barrages, waterway structures, hydraulic turbines, hydroelectric generators and power transmission networks. For the construction of a hydroelectric power plant, it is necessary to build a dam on the river under specific geographical conditions, such that the water flow in the upper reaches of the river can be gathered into a reservoir, thereby establishing an energy field of the gravity potential energy of the water flow. The hydraulic turbine is impacted to rotate and drive the hydroelectric generator to rotate by means of the impact force of the discharged water flow through the reservoir drainage pipe, such that the energy of the gravity acceleration of the discharged water flow is used at one time to generate electricity, and the energy field of the gravitational potential energy of the reservoir is simultaneously taken away. Moreover, conventional hydroelectric power plants are affected by the upstream river water and have dry periods, thereby failing to generate electricity at full capacity. In addition to using natural rivers to build conventional hydroelectric power plants, the height difference of the geographical location can also be used to build an upper pool reservoir, so as to artificially create a pumped-storage hydroelectric power plant with hydraulic potential energy. When the power system enters a valley load state in the midnight, the reversible pumping and power generation unit of the pumped-storage hydroelectric power plant consumes the electric energy of the power system in the pumping mode of the pump, such that the water flow from the lower pool reservoir is pumped and discharged into upper pool reservoir. When the power system enters a peak load state during the day, the water flow discharged from the upper pool reservoir forms a kind of hydrodynamic potential energy, and the reversible water pumping and power generation unit is used to generate electricity according to the power generation mode of the generator, which is also a one-time use of the gravitational potential energy of the discharged water flow to generate electricity. This just plays a role of peak shaving and valley filling, which is fed back to the power system. However, the total installed capacity of the power transmission network generators is not actually increased.

In view of the problems of the hydroelectric power generation technology, an underwater ducted hydroelectric power generation system is provided, which can not only effectively solve the problem of dry periods in conventional hydroelectric power plants, but also maintain the all-weather energy storage status of pumped-storage hydroelectric power plants. The underwater ducted hydroelectric power generation system can be activated at any time of a day to increase the installed capacity of the power transmission network.

SUMMARY

In the prior art, an energy field of gravitational potential energy is artificially established on a river. An object of the disclosure is to provide an underwater ducted hydroelectric power generation system, which is based on Newton's universal gravitation and the cornerstone model of gravity acceleration of the second law of motion, and directly adopts a depth of a reservoir, sea or lake. The underwater ducted hydroelectric power generation system is perpendicular to gravity, and is based on the connector principle. A water pipe of a connector is configured as a water inlet pipe, and a second water pipe is configured as a return pipe. A bottom of the water inlet pipe and a bottom of the return pipe are connected with an elbow to form a ducted U-shaped pipe structure. Since an upper end of the ducted U-shaped pipe structure opens upward and is immersed under a water surface, a water flow entering the water inlet pipe of the ducted U-shaped pipe is affected by a pressure of the water flow (pgh1=pgh2) and atmospheric pressure (PV=nRT), such that two water columns of the ducted U-shaped pipe can automatically become equal. In this way, natural can provides a natural energy field for the underwater ducted hydroelectric power generation system.

In order to solve the problem of dry periods in conventional hydropower stations while maintaining the all-weather energy storage state of pumped-storage hydropower stations, this application provides an underwater ducted hydroelectric power generation system, comprising a floating installation platform, a lifting pipe, a water inlet pipe, a ducted coreless hydroelectric generator, a platform connector, a ducted coreless water transfer pump and a return pipe; wherein the floating installation platform comprises an upper structure and a bottom structure; the lifting pipe is fixedly installed on an underwater ground; the bottom structure is slidably connected to the lifting pipe; the upper structure is slidably connected to the lifting pipe; and the platform connector is configured to lock the bottom structure with the upper structure as a whole; and the water inlet pipe is connected to the return pipe to form a ducted U-shaped pipe perpendicular to a water surface, and the ducted U-shaped pipe is configured to carry the ducted coreless hydroelectric generator and the ducted coreless water transfer pump.

The ducted coreless water transfer pump is an open front and rear ducted coreless hydroelectric generator, and is arranged a lowest position of the water inlet pipe. Water guide blades an impact-type fully through-flow turbine can be combined on a rotor permanent magnet structure of the ducted coreless hydroelectric generator, so as to directly function as a mechanical transmission function of the impact-type fully through-flow turbine.

In this application, a working mode of the ducted coreless water transfer pump provided is reverse to a working mode of the ducted coreless hydroelectric generator. The stator winding structure, rotor permanent magnet structure, and water guide blade structure of the ducted coreless water transfer pump similar to those of the ducted coreless hydroelectric generator. Therefore, this application is not intended to apply for the ducted coreless water transfer pump.

The ducted coreless water transfer pump is arranged at a highest position of a water outlet of the return pipe. As long as the ducted coreless water transfer pump is powered on, a water flow in the return pipe is pumped out. Under an action of gravity, water pressure and atmospheric pressure, the water inlet of the water inlet pipe forms a negative pressure state, such that the water flow entering the water inlet pipe generates a gravitational potential energy accelerated by gravity, which can impact the water guide blades of the ducted coreless hydroelectric generator from top to bottom, thereby driving the water guide blades to rotate and driving the ducted coreless hydroelectric generator to generate electric current. Under an action of water flow pressure and inertia force, a water flow passing through the water guide blades enters the return pipe, which can automatically return to a highest installation position of the ducted coreless water transfer pump from bottom to top under a self-balancing action of the connector. The ducted coreless water transfer pump does not consume electric energy due to lift resistance or suction resistance, thereby only consuming electric energy for discharged water flow. Therefore, as long as the ducted coreless water transfer pump can continue to operate, a circulating water flow of a gravitational potential energy can form a stable energy field of gravity acceleration. The underwater ducted hydroelectric power generation system can convert the electrical energy consumption of the ducted coreless water transfer pump. However, the function of the ducted coreless water transfer pump is actually utilized to establish an underwater ducted hydroelectric power generation system adopting gravitational potential energy. The underwater ducted hydroelectric power generation system can completely change the hydropower technology of conventional hydropower stations which dam rivers, and can also solve the problem of one-time discharge of gravity potential energy.

In some embodiments, the underwater ducted hydroelectric power generation system further comprises a bowl-shaped trash blocking net; wherein a bowl mouth of the bowl-shaped trash blocking net is connected to a bottom of the bottom structure; a bowl bottom of the bowl-shaped trash blocking net is connected to a water inlet of the water inlet pipe; and the bottom of the bottom structure is connected to a water outlet of the return pipe.

In some embodiments, the underwater ducted hydroelectric power generation system further comprises a pipe fixing component and a pipe connector.

Specifically, the lifting pipe is fixedly installed on an underwater ground; the bottom structure is slidably connected to the lifting pipe; the upper structure is slidably connected to the lifting pipe; and the platform connector is configured to lock the bottom structure with the upper structure as a double-layer structure. The bowl-shaped trash blocking net is connected to a bottom of the bottom structure. A first end of the pipe fixing component is connected to the return pipe, and a second end of the pipe fixing component is connected to the water inlet pipe, so as to strengthen the ducted U-shaped pipe. A first end of the pipe connector is connected to the water inlet pipe, and a second end of the pipe connector is connected to a return pipe of another ducted U-shaped pipe adjacent to the return pipe, which can form a plurality of mounting bodies, thereby further connecting a plurality of floating platforms together to increase the stability and mechanical strength of the floating platforms.

In some embodiments, the ducted coreless hydroelectric generator comprises a main shaft, a first fixing ring, a first fixing component, an annular housing, a plurality of stator winding curved magnetic yokes, a plurality of stator winding coils, a rotor permanent magnet, an annular bearing component, a second fixing component, a second fixing ring, a first rotor graphite bearing, a flange bolt, a bearing positioning sleeve, an annular mounting sleeve, water guide blades, a stator winding enameled wire, a flange of the annular housing and a second rotor graphite bearing.

Specifically, the first fixing ring is arranged on a first end of the main shaft, a first end of the first fixing component is connected with the first fixing ring, and a second end of the first fixing component is connected with the annular housing, thereby forming a first crisscross transparent structure. The second fixing ring is arranged on a second end of the main shaft. A first end of the second fixing component is connected to the second fixing ring, and a second end of the second fixing component is connected to the annular housing, thereby forming a second crisscross transparent structure. Furthermore, the flange bolt is provided on the annular housing, and is connected to the water inlet pipe and the return pipe.

Specifically, the number of the plurality of stator winding curved magnetic yokes is equal to the number of the plurality of stator winding coils. Since the plurality of stator winding curved magnetic yokes has a coreless structure, which have a large magnetic field air gap. The plurality of stator winding curved magnetic yokes can constrain magnetic field lines from spreading out of the stator winding coils, such that magnetic field line bundles are concentrated around the stator winding coil, which acts as a magnetic shield. Furthermore, the poured stator winding coils are each independently arranged on an inner wall of the annular housing.

Specifically, the rotor permanent magnet is composed of a plurality of permanent magnets arranged at an outer wall of the annular bearing component in an order from N-pole to S-pole; and an outer end of the water guide blade is arranged at an inner wall of the annular bearing component, and an inner end of the water guide blade is arranged at an outer wall of the annular mounting sleeve.

Specifically, the first rotor graphite bearing is sleevedly arranged on the main shaft. The bearing positioning sleeve is sleevedly arranged on the main shaft. The second rotor graphite bearing is sleevedly arranged on the main shaft. The annular mounting sleeve is sleevedly arranged on the first rotor graphite bearing and the second rotor graphite bearing, and is arranged below the water outlet of the water outlet pipe.

BRIEF DESCRIPTION OF THE DRAWINGS

In order to explain the technical solutions in the embodiments of the present disclosure or in the prior art more clearly, the accompanying drawings required in the description of the embodiments will be briefly described below. Obviously, presented in the drawings are merely some of the embodiments of the disclosure. For those of ordinary skill in the art, other drawings can be obtained based on the structures illustrated herein without making creative efforts.

In FIG. 1: 1001. upper structure of a floating installation platform; 1002. lifting pipe; 1003. pipe fixing component; 1004. pipe connector; 1005. bowl-shaped trash blocking net;

1006. water inlet pipe; 1007. ducted coreless hydroelectric generator; 1008. platform connector; 1009. ducted coreless water transfer pump; 10010. return pipe; 10011. bottom structure of the floating installation platform; and 10012. underwater output cable.

In FIG. 2: 1002. lifting pipe; 10010. return pipe; 10011. bottom structure; 1005. bowl-shaped trash blocking net; and 1006. water inlet pipe.

In FIG. 3: 1. main shaft; 2. first fixing ring; 3. first fixing component; 4. annular housing; 5. stator winding curved magnetic yoke; 6. stator winding coil; 7. rotor permanent magnet; 8. annular bearing component; 9. second fixing component; 10. second fixing ring; 11. first rotor graphite bearing; 12. flange bolt; 13. bearing positioning sleeve; 14. annular mounting sleeve; 15. water guide blade; 16. stator winding enameled wire; 17. flange; and 18. second rotor graphite bearing.

In FIG. 4: 1. main shaft; 2. first fixing ring; 3. first fixing component; 5. stator winding curved magnetic yoke; 6. stator winding coil; 7. rotor permanent magnet; 8. annular bearing component; 12. flange bolt; 14. annular mounting sleeve; 15. water guide blade; and 17. flange.

In FIG. 5: 5. stator winding curved magnetic yoke; 6. stator winding coil; 7. rotor permanent magnet; 8. annular bearing component; and 19. magnetic field line.

In FIG. 6: 1005. bowl-shaped trash blocking net; 1006. water inlet pipe; 1007. ducted coreless hydroelectric generator; 1009. ducted coreless water transfer pump; 10010. return pipe; and 12. flange bolt.

In FIG. 7: 2001. inner reservoir; 2002. outer reservoir; 2003. ducted coreless water transfer pump; 2004. pipeline valve; 2005. water inlet pipe; 2006. return pipe; 2007. ducted coreless hydroelectric generator; and 2008. base structure.

In FIG. 8: 2001. inner reservoir; 2002. outer reservoir; 2005. water inlet pipe; 2006. return pipe; 2008. base structure; 2009. inner ring water inlet pipe; and 20010. inner ring return pipe.

In FIG. 9: 3001. reservoir; 3002. ducted coreless water transfer pump; 3003. pipeline valve; 3004. return pipe; 3005. water inlet pipe; 3006. ducted coreless hydroelectric generator; and 3007. reservoir bracket.

In FIG. 10: 3001. reservoir; 3004. return pipe; 3005. water inlet pipe; and 3007. reservoir bracket.

In FIG. 11: 4001. offshore fishing boat; 4002. reservoir; 4003. pipeline valve; 4004. ducted coreless water transfer pump; 4005. water inlet pipe; 4006. return pipe; 4007. ducted coreless hydroelectric generator; 4008. cockpit; and 4009. battery pack.

DETAILED DESCRIPTION OF EMBODIMENTS

The technical solutions in the embodiments of the present disclosure will be clearly and completely described below with reference to the accompanying drawings of the present disclosure. Obviously, provided herein are merely some of the embodiments of the disclosure, instead of all of the embodiments. Based on the embodiments provided herein, all other embodiments obtained by those of ordinary skill in the art without making creative efforts shall fall within the scope of the disclosure defined by the appended claims.

Embodiment 1

Figure 1:
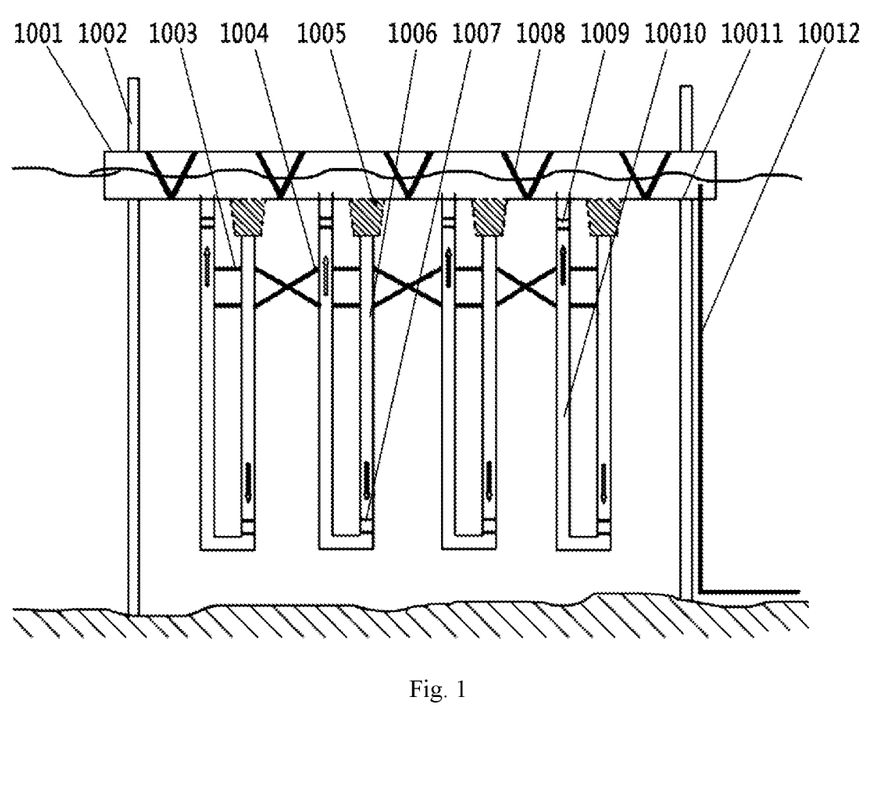
FIG. 1 is a schematic structural diagram of an underwater ducted hydroelectric power generation system in accordance with an embodiment of the present disclosure.
Figure 2:
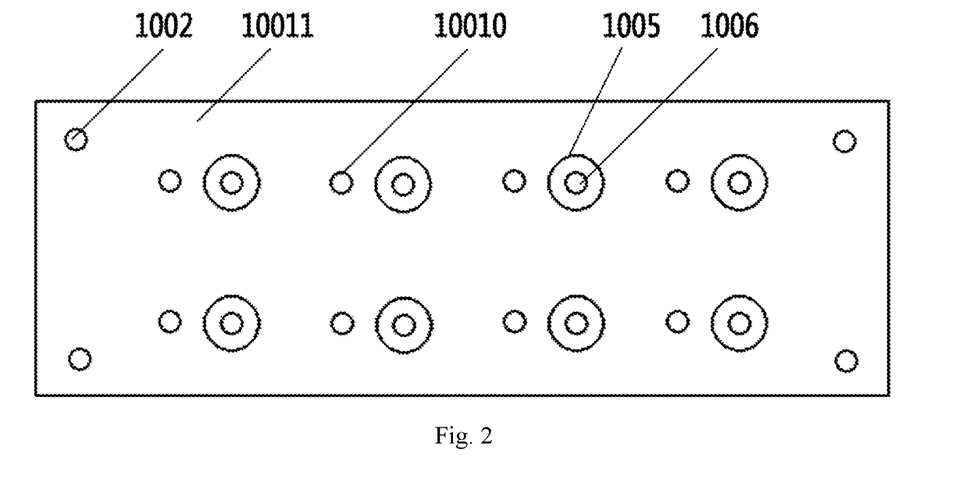
FIG. 2 is a top view of a bottom structure of a floating installation platform of the underwater ducted hydroelectric power generation system in accordance with an embodiment of the present disclosure.

As shown in FIGS. 1-2, this application provides an underwater ducted hydroelectric power generation system, which includes a floating installation platform including an upper structure 1001 and a bottom structure 10011, lifting pipes 1002, a pipe fixing component 1003, a pipe connector 1004, a bowl-shaped trash blocking net 1005, a water inlet pipe 1006, a ducted coreless hydroelectric generator 1007, a platform connector 1008, a ducted coreless water transfer pump 1009, a return pipe 10010, and an underwater output cable 10012.

The floating installation platform is a two-layer platform structure formed by the upper structure 1001 and the bottom structure 10011. The lifting pipes 1002 are a base of the underwater ducted hydroelectric power generation system. A lower end of each of four vertical lifting pipes 1002 is fixed on an underwater ground a reservoir. The bottom structure 10011 is slidingly connected to an upper end of each of the lifting pipes 1002. The upper structure 1001 is slidingly connected to the lifting pipes 1002. The bottom structure 10011 is locked with the upper structure 1001 through the platform connector 1008. According to changes in a height of a water surface, the upper structure 1001 can keep the ducted U-shaped pipe of the underwater ducted hydroelectric power generation system at a highest water level of the reservoir by using the sliding connection function of the lifting pipes 1002.

The bowl-shaped trash blocking net 1005 is in a bowl shape, and has a bowl mouth connecting to a bottom of the bottom structure 10011 and a bowl bottom connecting to a water inlet of the water inlet pipe 1006. A water outlet of the water inlet pipe 1006 is connected to the return pipe 10010 through the pipe fixing component 1003 to form the ducted U-shaped pipe. Furthermore, the bowl-shaped trash blocking net 1005 of the ducted U-shaped pipe is connected to the bottom of the bottom structure 10011. The return pipe 10010 of the ducted U-shaped pipe is connected to the bottom of the bottom structure 10011 to form a hanging installation structure.

A first end of the pipe fixing component 1003 is arranged on the return pipe 10010, and a second end of the pipe fixing component 1003 is arranged on the water inlet pipe 1006. A first end of the pipe connector 1004 is fixedly arranged on the water inlet pipe 1006, and a second end of the pipe connector 1004 is connected to an adjacent return pipe 10010, so as to form an installation body with a multi-duted U-shaped pipeline structure. Furthermore, a plurality of floating installation platforms can be connected together to increase the stability and mechanical strength of a water surface platform.

Figure 3:
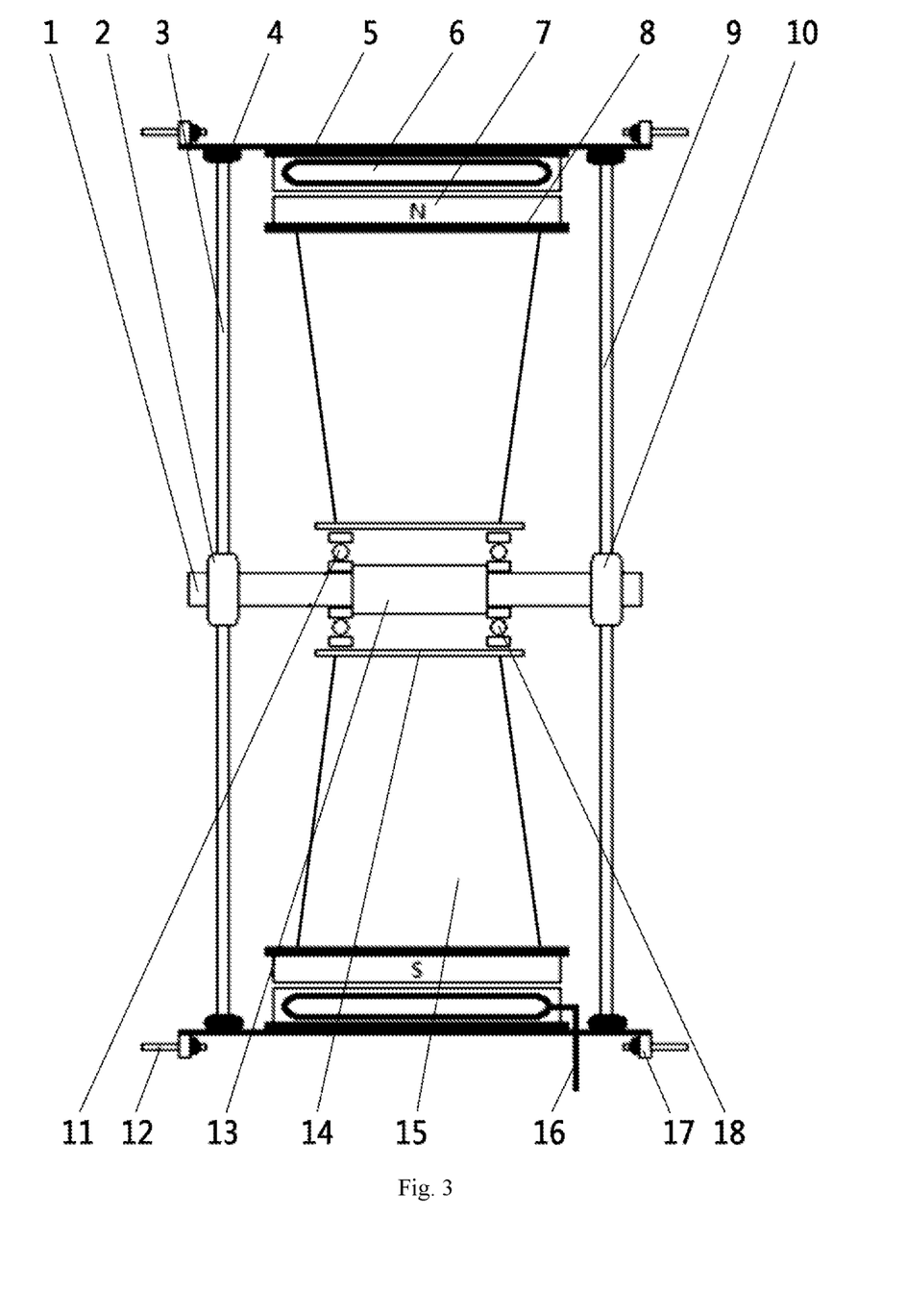
FIG. 3 is a longitudinal sectional view of a ducted coreless hydroelectric generator in accordance with an embodiment of the present disclosure.
Figure 4:
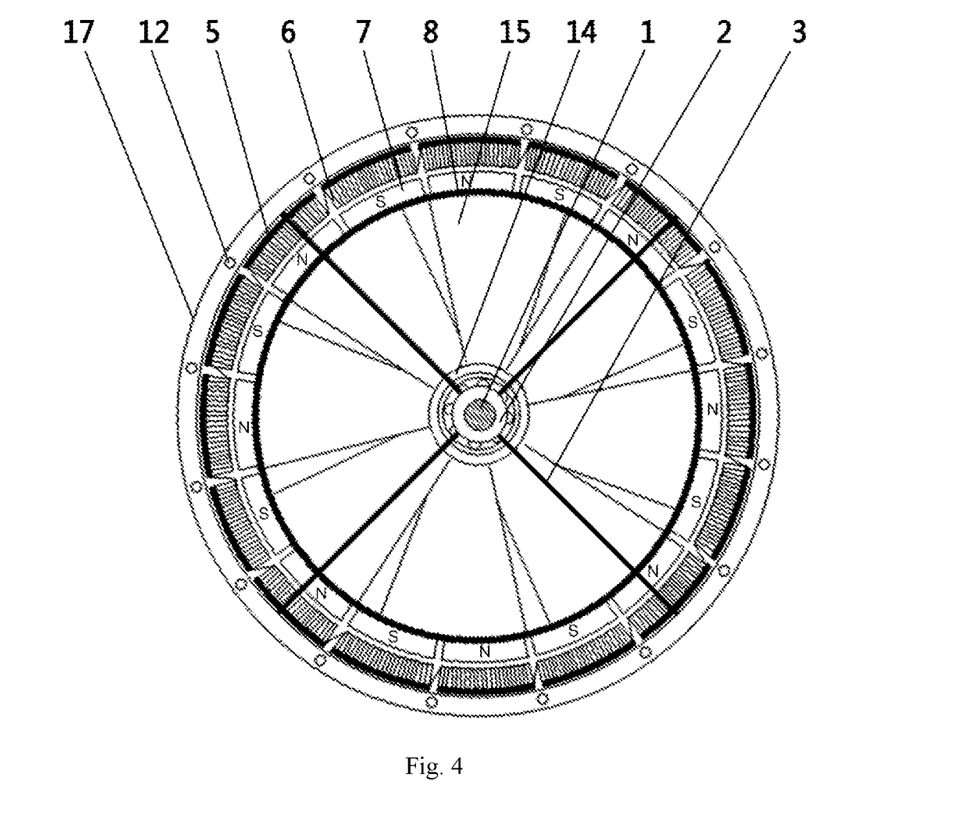
FIG. 4 is a top view of the ducted coreless hydroelectric generator in accordance with an embodiment of the present disclosure.

In this embodiment, the ducted coreless hydroelectric generator 1007 incudes a main shaft 1, a first fixing ring 2, a first fixing component 3, a annular housing 4, a plurality of stator winding curved magnetic yokes 5, a plurality of stator winding coils 6, a rotor permanent magnet 7, an annular bearing component 8, a second fixing component 9, a second fixing ring 10, a first rotor graphite bearing 11, a flange bolt 12, a bearing positioning sleeve 13, an annular mounting sleeve 14, water guide blades 15, a stator winding enameled wire 16, a flange of the annular housing 17 and a second rotor graphite bearing 18.

As illustrated in FIGS. 3-4, the annular housing 4 is equivalent to a shell of a traditional generator. In this embodiment, the annular housing 4 is a basic component of the ducted coreless hydroelectric generator, which is connected to the first fixing component 3. The first fixing component 3 includes four fixing components. A first end of each of the four fixing components is independently arranged on the first fixing ring of the main shaft 2, such that the first fixing ring of the main shaft 2 is sleevedly arranged on the main shaft 1 presenting a cross-shaped structure. A second end of each of the four fixing components is independently arranged on an inner wall of the annular housing 4, which is equivalent to an end cover of the traditional generator. The second fixing ring of the main shaft 10 is sleevedly arranged on a second end of the main shaft 1. The flange bolts 12 are arranged on the annular housing 4 through the second fixing component 9, thereby connecting to the water inlet pipe 1006 and the return pipe 10010.

Figure 5:
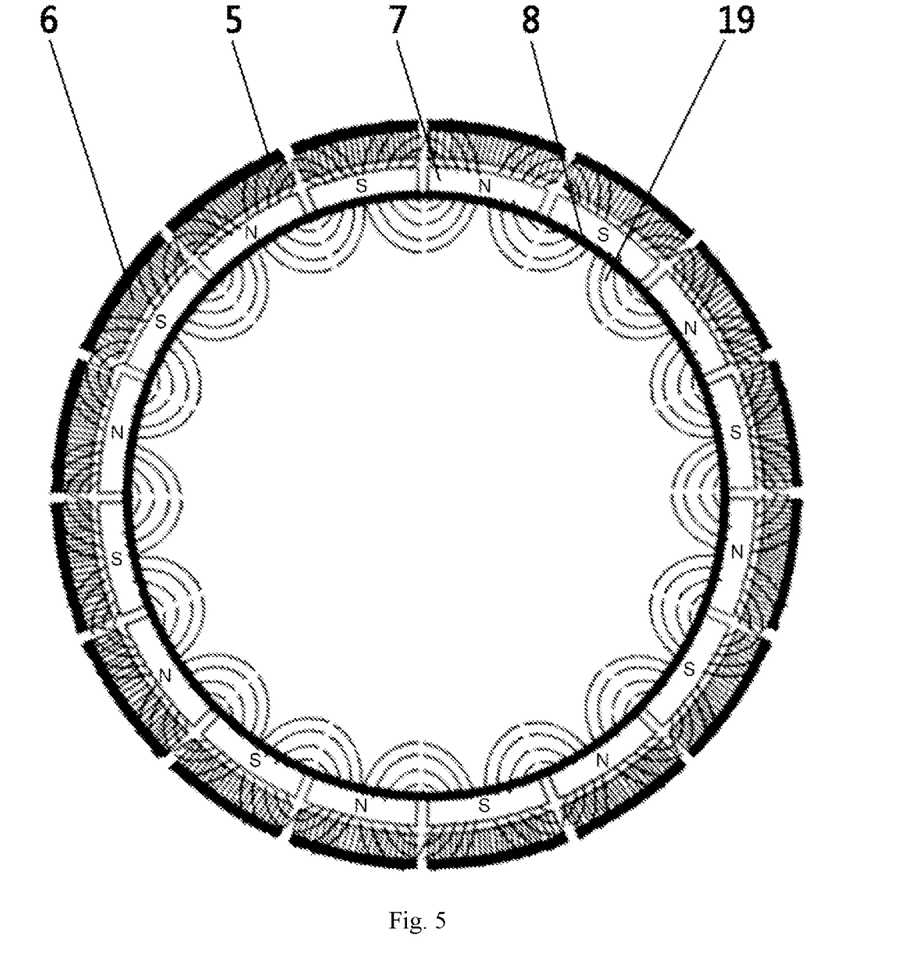
FIG. 5 schematically shows magnetic field lines of the ducted coreless hydroelectric generator in accordance with an embodiment of the present disclosure.

As illustrated in FIGS. 3-5, the number of the plurality of stator winding curved magnetic yokes 5 is equal to the number of the plurality of stator winding coils 6. The stator winding coils 6 are formed by winding the stator winding enameled wire 16. The plurality of stator winding curved magnetic yokes 5 and the stator winding coils 16 are cast with a polymer resin material into an annular stator structure, which can play an insulating and waterproof role. Since the stator winding adopts a coreless structure and a large magnetic field air gap, setting the plurality of stator winding curved magnetic yokes 5 can constrain magnetic field lines from spreading out of the stator winding coils 6, such that magnetic field line bundles are concentrated around the stator winding coil, which acts as a magnetic shield. Furthermore, the poured stator winding coils 6 are each independently arranged on the inner wall of the annular housing 4.

As illustrated in FIGS. 3-4, the rotor permanent magnet 7 is composed of a plurality of permanent magnets. The plurality of permanent magnets are arranged on an outer wall of the annular bearing component 8 in an order from N-pole to S-pole. Furthermore, the rotor permanent magnet 7 and the annular bearing component 8 are plastic-sealed in polymer materials. An outer end of each of the water guide blades 15 is independently arranged on an inner wall of the annular bearing component 8, and an inner end of each of the water guide blades 15 is independently arranged on the annular mounting sleeve 14. It can be understood that the number of the water guide blades 15 can be more than 9 or less than 7. In this embodiment, the number of the water guide blades 15 is 8.

As illustrated in FIGS. 3-4, the first rotor graphite bearing 11 is sleevedly arranged on the main shaft 1. The bearing positioning sleeve 13 is sleevedly arranged on the main shaft 1. The second rotor graphite bearing 18 is sleevedly arranged on the main shaft 1. The annular mounting sleeve 14 is sleevedly arranged on the first rotor graphite bearing 11 and the second rotor graphite bearing 18.

As illustrated in FIGS. 3-4, the second fixing component 9 includes four fixing components. A first end of each of the four fixing components is independently arranged on the second fixing ring 10. The second fixing ring 10 is sleevedly arranged on the main shaft 1. Furthermore, a second end of each of the four fixing components is independently arranged on the inner wall of the annular housing 4 presenting a cross-shaped structure, so as to form an open water flow channel, which is transparent from front to back with the first fixing ring 2. When the gravitational potential energy in the U-shaped water flow pipe passes through the water guide blades 15, the water guide blades 15 are driven to rotate, thereby generating a rotating magnetic field, which can induce the stator winding coil 6 to generate electrical energy.

Figure 6:
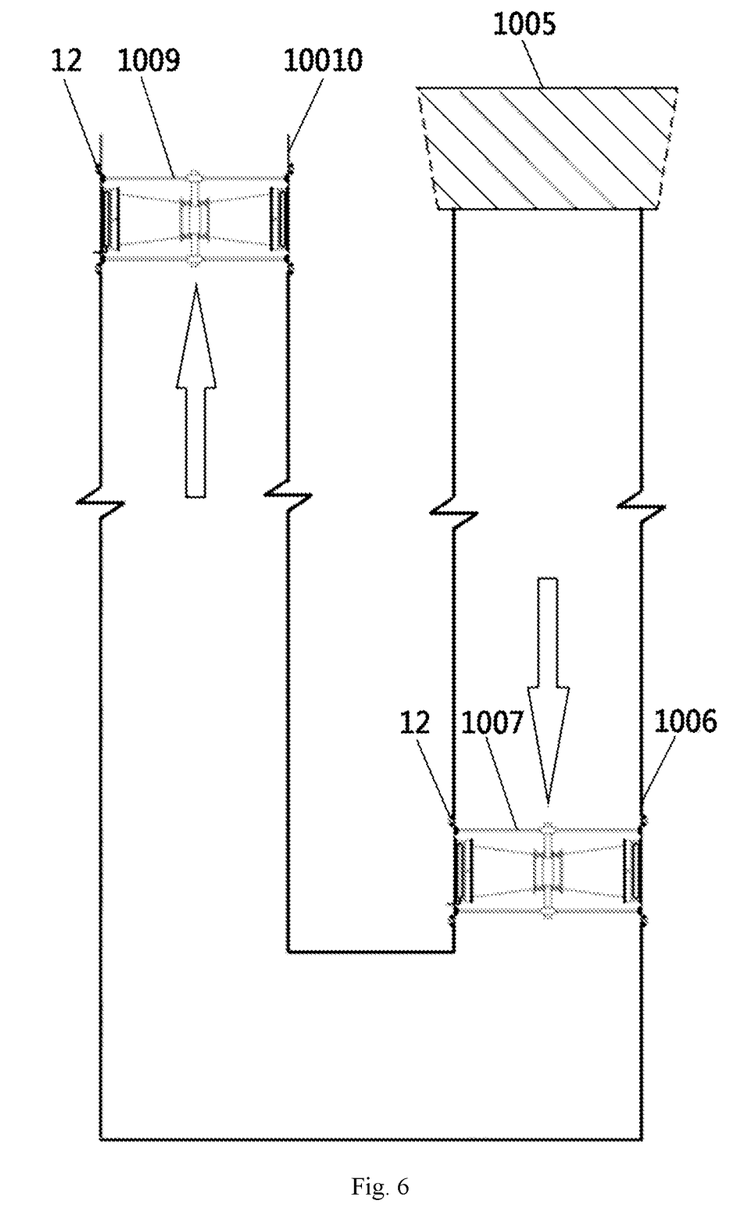
FIG. 6 is a side sectional view of a ducted U-shaped pipe of the underwater ducted hydroelectric power generation system in accordance with an embodiment of the present disclosure.

As illustrated in FIG. 6, the underwater ducted hydroelectric power generation system provided by the present disclosure includes a ducted coreless water transfer pump 1009, a return pipe 10010 and a flange bolt 12.

A working mode of the ducted coreless water transfer pump 1009 is reverse to a working mode of the ducted coreless hydroelectric generator 1007, which is arranged on an inner wall of the return pipe 10010. The ducted coreless hydroelectric generator 1007 is designed with a coreless rotor permanent magnet structure, and is configured to pump circulating water in the ducted U-shaped pipe to the water surface after powered on. The return pipe 10010 is provided with a pipe flange connection device, which can be fixedly connected to the ducted coreless water transfer pump 1009.

The underwater ducted hydroelectric power generation system provided in this application can be provided in rivers, lakes, seas and reservoirs. In addition, the underwater ducted hydroelectric power generation system can be provided in existing coal-fired power generation systems.

Embodiment 2

Figure 7:
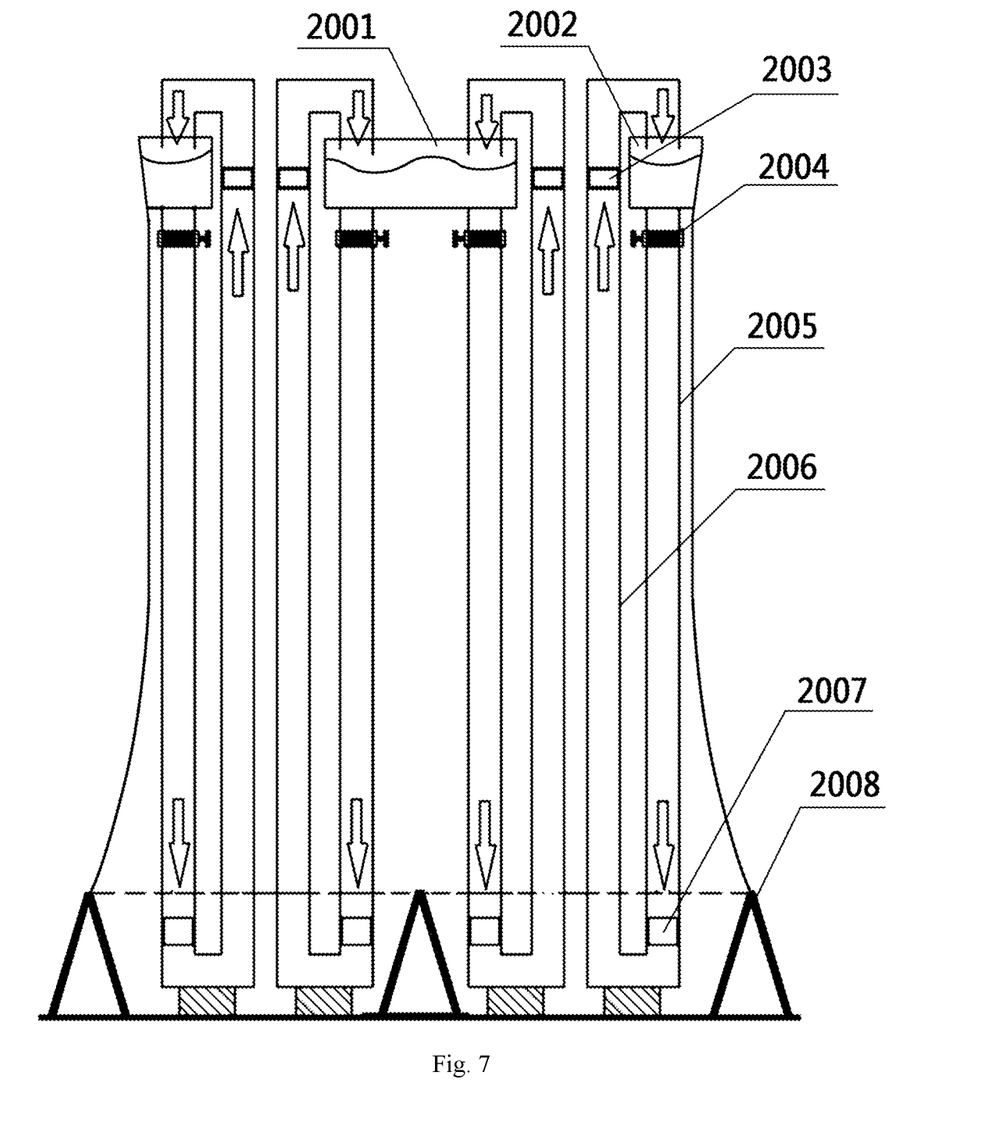
FIG. 7 is a side view of an underwater ducted hydroelectric power generation system for a coal-fired power plant in accordance with an embodiment of the present disclosure.
Figure 8:
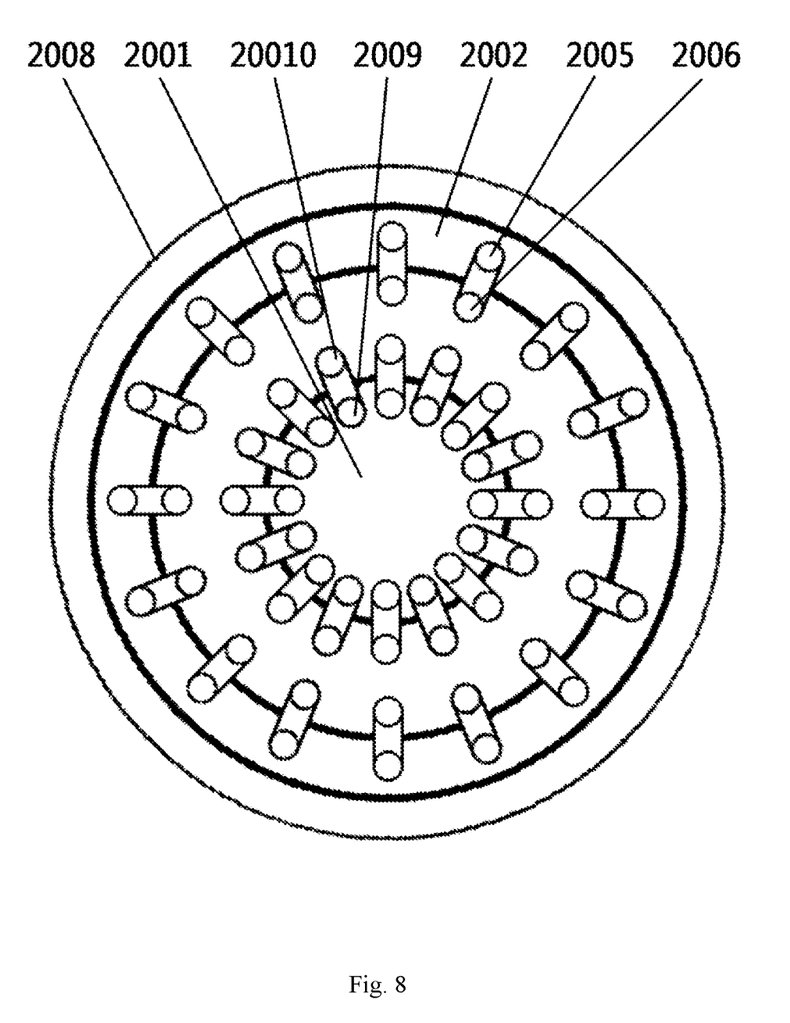
FIG. 8 is a top view of the underwater ducted hydroelectric power generation system for the coal-fired power plant in accordance with an embodiment of the present disclosure.

As illustrated in FIGS. 7-8, a ducted hydroelectric power generation system of for coal-fired power plant is provided, which includes a cooling tower, an inner reservoir 2001, an outer reservoir 2002, a ducted coreless water transfer pump 2003, a pipeline valve 2004, a water inlet pipe 2005, a return pipe 2006, a ducted coreless hydroelectric generator 2007 and a base structure 2008.

The outer reservoir 2002 is arranged on the cooling tower. The water inlet pipe 2005 is arranged at a bottom of the outer reservoir 2002. The pipeline valve 2004 is arranged at a water inlet of the water inlet pipe 2005 to facilitate the maintenance of devices in the water inlet pipe 2005. The ducted coreless hydroelectric generator 2007 is arranged at a bottom of the water inlet pipe 2005. The return pipe 2006 is connected to the water inlet pipe 2005 to form a vertical ducted U-shaped pipe. The ducted coreless water transfer pump 2003 is arranged at a water outlet of the return pipe 2006.

The cooling tower is a main device for cooling generator sets in the coal-fired power plant. At present, a way of shutting down the coal-fired power plants is to blow up the cooling tower. In this application, an internal space of the cooling tower can be fully used, and a plurality of ducted U-shaped pipes can be installed. In addition, existing cooling water resources of the power plant can be used, such that the ducted coreless hydroelectric generator can generate electricity without consuming a drop of water as long as a high-level reservoir is filled once.

Embodiment 3

A high-level water tank facility is built next to a highway service area or gas station. A plurality of ducted U-shaped pipes are installed according to an perimeter of the high-level water tank. As long as the high-level water tank is filled with water, a ducted hydroelectric power generation system can supplement the electric energy according to a cruising range of an electric vehicle.

Figure 9:
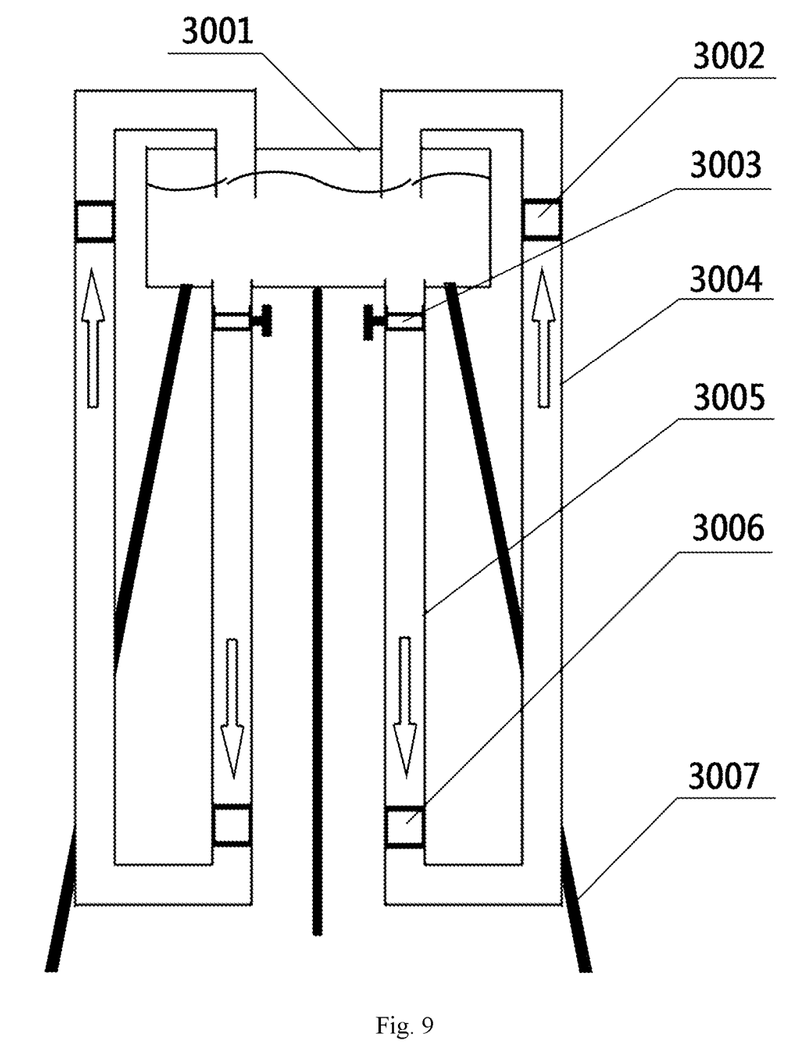
FIG. 9 is a side view of an underwater ducted hydroelectric power generation system for a gas station in accordance with an embodiment of the present disclosure.
Figure 10:
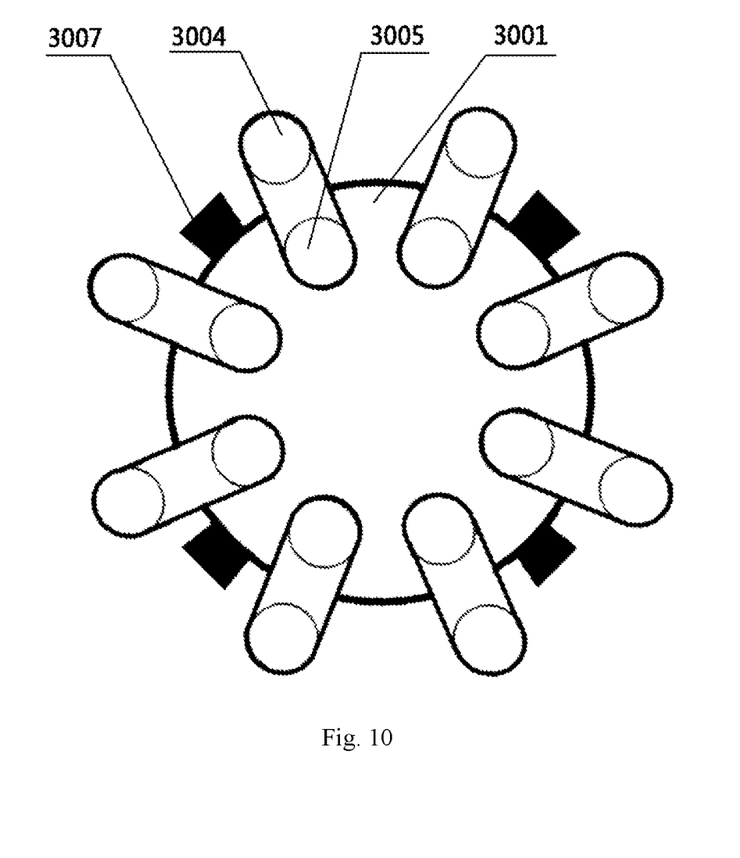
FIG. 10 is a top view of the underwater ducted hydroelectric power generation system for the gas station in accordance with an embodiment of the present disclosure.

As illustrated in FIGS. 9-10, an underwater ducted hydroelectric power generation system for the highway service area is provided, which includes a water tower, a reservoir 3001, a ducted coreless water transfer pump 3002, a pipeline valve 3003, a return pipe 3004, a water inlet pipe 3005, a ducted coreless hydroelectric generator 3006 and a reservoir bracket 3007.

The reservoir 3001 is arranged on the reservoir bracket 3007. The water inlet pipe 3005 is arranged at a bottom of the reservoir 3001. The pipeline valve 3003 is arranged at a water inlet of the water inlet pipe 3005 to facilitate the maintenance of devices in the water inlet pipe 3005. The ducted coreless hydroelectric generator 3006 is arranged at a bottom of the water inlet pipe 3005. The return pipe 3004 is connected to the water inlet pipe 3005 to form a vertical ducted U-shaped pipe. The ducted coreless water transfer pump 3002 is arranged at a water outlet of the return pipe 3004.

It can be considered that based on an energy conversion efficiency of a pumped-storage hydroelectric power plant, the power-generation power of the ducted coreless hydroelectric generator minus the power consumption of the ducted coreless water transfer pump is the power generation consumption of the ducted hydroelectric power generation system, which can be described as almost free power generation consumption, and also save the construction consumption of power transmission networks.

Embodiment 4

Described in the above embodiments are all power generation technologies in a fixed manner. An offshore fishing boat using a ducted hydroelectric power generation system for mobile hydroelectric power generation is provided in this embodiment.

The operation of the offshore fishing boat not only requires the consumption of petroleum energy, but also requires the energy consumption for keeping fish fresh in ice or cold sea water. A cabin with a temperature of 0° C. is called a high-temperature cabin, and a cabin with a temperature of −18° C. to −35° C. is called a low-temperature cabin. Therefore, it is necessary to provide electric energy for freezing and refrigerating the caught fish. Regarding the existing offshore fishing boats, a diesel generator set is adopted to provide electrical energy for a refrigeration compressor unit. Based on the theoretical analysis, according to load requirements of the offshore fishing boat, it is feasible to install a ducted hydroelectric power generation system on the offshore fishing boat while eliminating the weight of a diesel generator and the required fuel. The ducted hydroelectric power generation system can basically satisfy the electricity consumption of refrigeration compressors on the offshore fishing boat for freezing and refrigeration.

Figure 11:
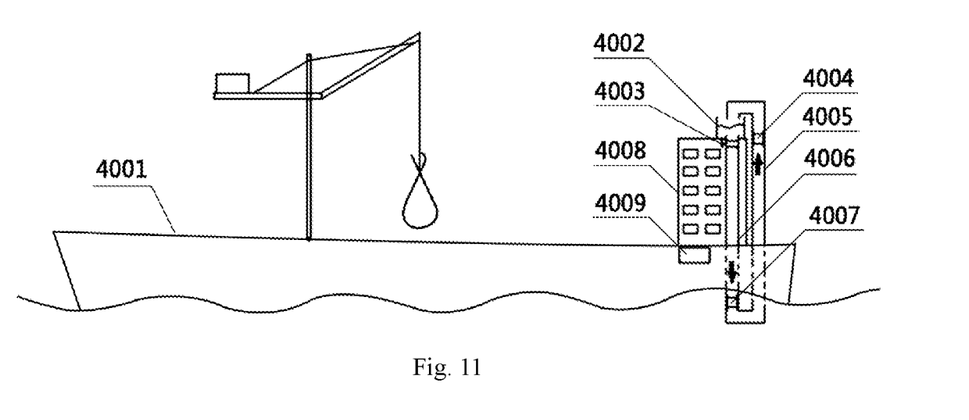
FIG. 11 is a schematic structural diagram of an underwater ducted hydroelectric power generation system for an offshore fishing boat in accordance with an embodiment of the present disclosure.

As shown in FIG. 11, the ducted hydroelectric power generation system for the offshore fishing boat includes an offshore fishing boat 4001, a ducted coreless water transfer pump 4004, a water inlet pipe 4005, a return pipe 4006, a ducted coreless hydroelectric generator 4007, a cockpit 4008 and a battery pack 4009.

The reservoir 4002 is arranged on the cockpit 4008. The water inlet pipe 4005 is arranged at a bottom of the reservoir 4002. The pipeline valve 4003 is arranged at a water inlet of the water inlet pipe 4005 to facilitate the maintenance of devices in the water inlet pipe 4005. The ducted coreless hydroelectric generator 4007 is arranged at a bottom of the water inlet pipe 4005. The return pipe 4006 is connected to the water inlet pipe 4005 to form a vertical ducted U-shaped pipe. The ducted coreless water transfer pump 4004 is arranged at a water outlet of the return pipe 4006. The battery pack 4009 is a starting power supply for starting the ducted coreless water transfer pump 4004. After the ducted coreless hydroelectric generator 4007 generates electricity, the battery pack 4009 will become a regulated power supply for a refrigeration compressor.

What is claimed is:

1. An underwater ducted hydroelectric power generation system, comprising:
    a floating installation platform;
    a lifting pipe;
    a water inlet pipe;
    a ducted coreless hydroelectric generator;
    a platform connector;
    a ducted coreless water transfer pump; and
    a return pipe;
    wherein the floating installation platform comprises an upper structure and a bottom structure;
    the lifting pipe is fixedly installed on an underwater ground; the bottom structure is slidably connected to the lifting pipe; the upper structure is slidably connected to the lifting pipe; and the platform connector is configured to lock the bottom structure with the upper structure as a whole; and
    the water inlet pipe is connected to the return pipe to form a ducted U-shaped pipe perpendicular to a water surface, and the ducted U-shaped pipe is arranged under the water surface, and is configured to carry the ducted coreless hydroelectric generator and the ducted coreless water transfer pump.

2. The underwater ducted hydroelectric power generation system of claim 1, further comprising:
    a bowl-shaped trash blocking net;
    wherein a bowl mouth of the bowl-shaped trash blocking net is connected to a bottom of the bottom structure; a bowl bottom of the bowl-shaped trash blocking net is connected to a water inlet of the water inlet pipe; and the bottom of the bottom structure is connected to a water outlet of the return pipe.

3. The underwater ducted hydroelectric power generation system of claim 1, further comprising:
    a pipe fixing component; and a pipe connector;
wherein a first end of the pipe fixing component is connected to the return pipe, and a second end of the pipe fixing component is connected to the water inlet pipe; and a first end of the pipe connector is connected to the water inlet pipe, and a second end of the pipe connector is connected to another adjacent return pipe.

4. The underwater ducted hydroelectric power generation system of claim 1, wherein the ducted coreless hydroelectric generator is provided at a bottom of the water inlet pipe, and the ducted coreless water transfer pump is provided in the return pipe below a water outlet of the return pipe.

5. The underwater ducted hydroelectric power generation system of claim 4, wherein the ducted coreless hydroelectric generator comprises a main shaft, a first fixing ring, an annular housing, a first fixing component, a second fixing component, a second fixing ring and a flange bolt; and the first fixing ring is sleevedly provided at a first end of the main shaft; a first end of the first fixing component is connected to the first fixing ring, and a second end of the first fixing component is connected to the annular housing; the second fixing ring is sleevedly provided at a second end of the main shaft; a first end of the second fixing component is connected to the second fixing ring, and a second end of the second fixing component is connected to the annular housing; and the flange bolt is provided on the annular housing, and are connected to the water inlet pipe and the return pipe.

6. The underwater ducted hydroelectric power generation system of claim 5, further comprising:
a plurality of stator winding curved magnetic yokes;
a plurality of stator winding coils; and
a stator winding enameled wire;
wherein the number of the plurality of stator winding curved magnetic yokes is equal to the number of the plurality of stator winding coils, and is arranged on an outer circumference of the plurality of stator winding coils; the plurality of stator winding coils are formed by winding the stator winding enameled wire; the plurality of stator winding curved magnetic yokes are configured to constrain magnetic field lines from spreading outside the plurality of stator winding coils; and the plurality of stator winding curved magnetic yokes and the stator winding coils are cast with a polymer resin material into an annular stator structure, and the annular stator structure is arranged at an inner wall of the annular housing.

7. The underwater ducted hydroelectric power generation system of claim 6, further comprising:
a rotor permanent magnet;
an annular bearing component;
an annular mounting sleeve; and
a water guide blade;
wherein the rotor permanent magnet is composed of a plurality of permanent magnets arranged at an outer wall of the annular bearing component in an order from N-pole to S-pole; and an outer end of the water guide blade is arranged at an inner wall of the annular bearing component, and an inner end of the water guide blade is arranged at an outer wall of the annular mounting sleeve.

8. The underwater ducted hydroelectric power generation system of claim 7, further comprising:
a bearing positioning sleeve;
a first rotor graphite bearing; and
a second rotor graphite bearing;
wherein the first rotor graphite bearing is sleevedly arranged on the main shaft; the bearing positioning sleeve is sleevedly arranged on the main shaft, and the second rotor graphite bearing is sleevedly arranged on the main shaft; and the annular mounting sleeve is a graphite bearing annular mounting sleeve, and is sleevedly arranged on outer walls of the first rotor graphite bearing and the second rotor graphite bearing.

9. The underwater ducted hydroelectric power generation system of claim 7, wherein a working mode of the ducted coreless water transfer pump is reverse to a working mode of the ducted coreless hydroelectric generator, and is arranged on an inner wall of the return pipe; the ducted coreless water transfer pump is configured to pump circulating water in the ducted U-shaped pipe to the water surface after powered on; and the return pipe is provided with a pipe flange connection device, and is fixedly connected to the ducted coreless water transfer pump.

10. The underwater ducted hydroelectric power generation system of claim 4, wherein the underwater ducted hydroelectric power generation system is applied on land; the underwater ducted hydroelectric power generation system further comprises an outer reservoir, an inner reservoir and a cooling tower; the outer reservoir and the inner reservoir are provided on the cooling tower; the water inlet pipe is provided at a bottom of the outer reservoir, and a pipeline valve is arranged at the water inlet of the water inlet pipe; the ducted coreless hydroelectric generator is arranged at a bottom of the water inlet pipe; the return pipe is connected to the water inlet pipe to form a vertical ducted U-shaped pipe; and the ducted coreless water transfer pump is arranged at the water outlet of the return pipe.

* * * * *

UNITED STATES PATENT AND TRADEMARK OFFICE
CERTIFICATE OF CORRECTION

PATENT NO. : 12,378,940 B2  
APPLICATION NO. : 18/591072  
DATED : August 5, 2025  
INVENTOR(S) : Jirong Lu et al.

Page 1 of 1

It is certified that error appears in the above-identified patent and that said Letters Patent is hereby corrected as shown below:

On the Title Page

Please correct Item (73) the assignee's name, which should be: Yao Lu

Signed and Sealed this  
Second Day of September, 2025

Coke Morgan Stewart  
*Acting Director of the United States Patent and Trademark Office*